United States Patent [19]

Witten et al.

[11] 4,158,422

[45] Jun. 19, 1979

[54] SAFETY PRESSURE RELIEF APPARATUS

[75] Inventors: John E. Witten; Loren E. Wood; Edward H. Short, III, all of Tulsa, Okla.

[73] Assignee: Black, Sivalls & Bryson, Inc., Houston, Tex.

[21] Appl. No.: 832,417

[22] Filed: Sep. 12, 1977

[51] Int. Cl.² ............................................. F16K 17/40
[52] U.S. Cl. .................................. 220/89 A; 137/68 R
[58] Field of Search ............. 220/89 A, 85 P; 137/67, 137/68 R

[56] References Cited

U.S. PATENT DOCUMENTS

| 1,157,685 | 10/1915 | Fryer | 220/89 A |
| 1,930,138 | 10/1933 | Van Derhoef | 220/89 A |
| 2,095,828 | 10/1937 | Nerad | 220/89 A |
| 2,276,830 | 3/1942 | Doran | 220/89 A |
| 2,764,173 | 9/1956 | Renner | 220/89 A |
| 3,213,949 | 10/1965 | Kistler, Jr. | 137/68 R |
| 3,685,686 | 8/1972 | Raidl | 220/89 A |
| 3,922,767 | 12/1975 | Solter et al. | 220/89 A |

FOREIGN PATENT DOCUMENTS

| 637667 | 5/1928 | France | 220/85 T |
| 396515 | 8/1973 | U.S.S.R. | 137/68 R |

Primary Examiner—William Price
Assistant Examiner—Allan N. Shoap
Attorney, Agent, or Firm—Laney, Dougherty, Hessin & Beavers

[57] ABSTRACT

The present invention relates to a safety pressure relief apparatus comprised of a reverse buckling rupture disk having a concave-convex portion connected to an annular flat flange portion by a curved transition connection and a support member having an annular flat flange portion for engaging the annular flat flange portion of the rupture disk and for supporting the transition connection thereof. The support member includes a cutting edge positioned interiorly of the transition connection and forming an opening in the support member so that when the concave-convex portion of the rupture disk reverses itself, the cutting edge severs the disk whereby a portion thereof passes through the opening in the support member. A bar for catching the severed portion of the disk after it passes through the opening in the support member is attached to the support member.

8 Claims, 9 Drawing Figures

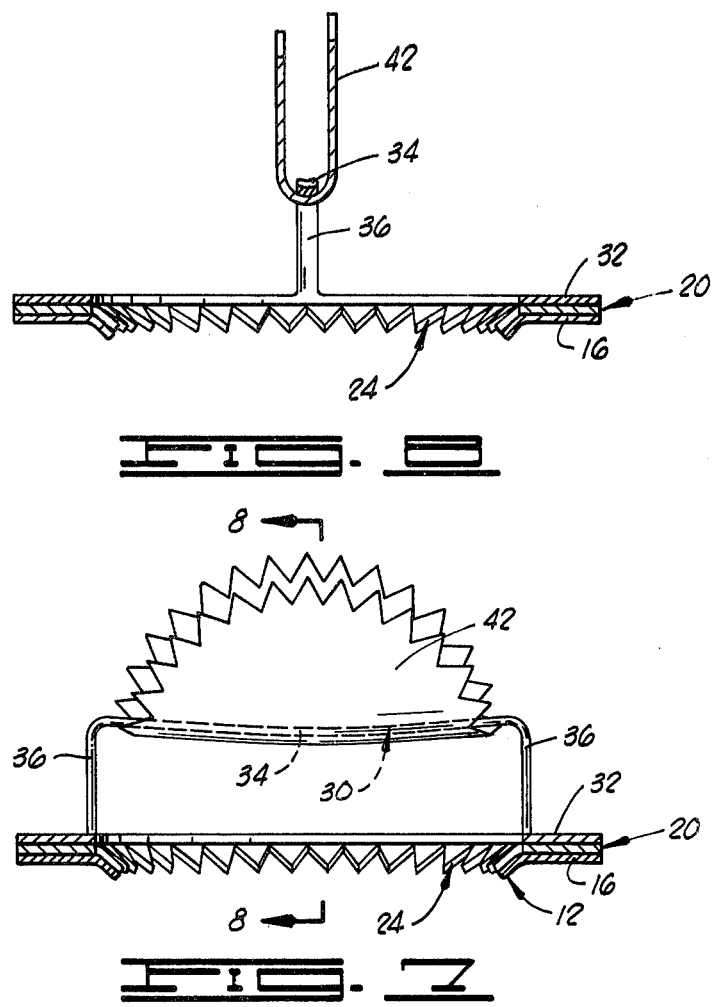
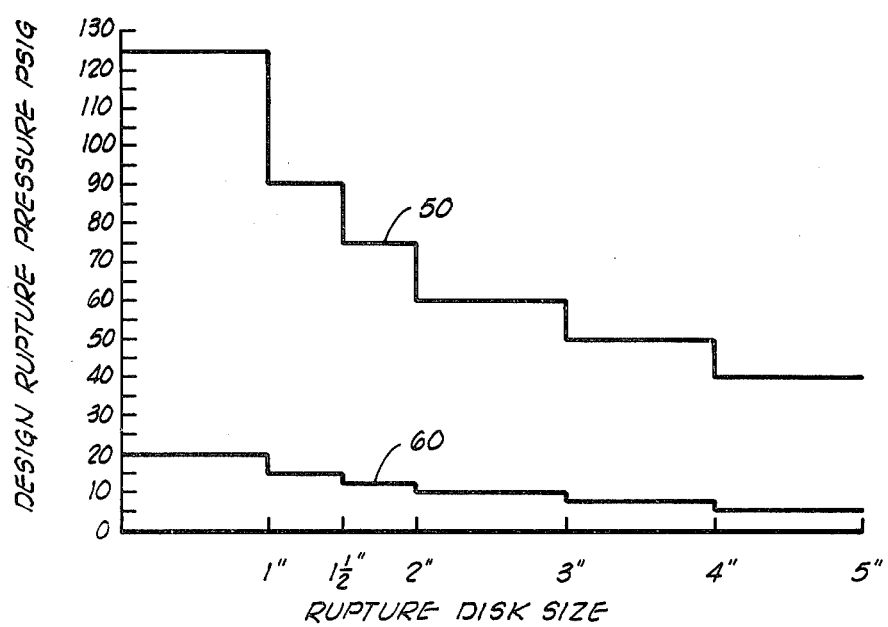
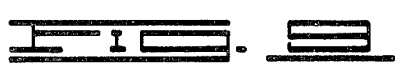

SAFETY PRESSURE RELIEF APPARATUS

BACKGROUND OF THE INVENTION

1. Field of the Invention

This invention relates generally to safety pressure relief apparatus, and more particularly, but not by way of limitation, to a safety pressure relief apparatus which includes a reverse buckling rupture disk.

2. Description of the Prior Art

A variety of safety pressure relief apparatus of the rupture disk type have been developed. Generally, these devices include a rupture disk supported between a pair of complementary supporting members of flanges which are in turn connected to a relief connection in a vessel or system containing fluid pressure. When the fluid pressure within the vessel or system exceeds the design rupture pressure of the disk, rupture occurs causing fluid pressure to be relieved from the vessel or system.

In recent years, rupture disk assemblies of the "reverse buckling" type have been developed which are capable of operating at 90 percent or more of the pressure at which the disk is designed to rupture. Such assemblies generally include a rupture disk having a concave-convex portion connected to an annular flat flange portion by a curved transition connection and a pair of annular supporting members between which the annular flat flange portion of the rupture disk is clamped. The rupture disk is positioned in the assemby so that fluid pressure from the system or vessel to be protected is exerted on the convex side of the disk. This results in the disk being placed in compression during operation and allows the normal fluid pressure exerted on the disk to be relatively close to the pressure at which the disk is designed to rupture.

In order to open the disk and to prevent the formation of loose pieces upon rupture, reverse buckling rupture disk assemblies have heretofore included knife blades upon which the disk impales when reversed by excess fluid pressure. One such knife blade assembly is described in U.S. Pat. No. 3,294,277 which is assigned to the assignee of this present invention. In addition, reverse buckling rupture disks have been developed and used which include scores or grooves on a surface of the concave-convex portion of the disk creating lines of weakness therein so that upon reversal, the concave-convex portion tears along the lines of weakness and opens without loose pieces being formed. Such a scored reverse buckling rupture disk is described in U.S. Pat. No. 3,484,817, assigned to the assignee of this invention.

In the heretofore used reverse buckling rupture disk apparatus including knife blades, the knife blades are usually arranged so that upon reversal, the concave-convex portion of the rupture disk is cut into quarters or petals which are folded outwardly by the force of fluid under pressure flowing therethrough. Such knife blades are costly to manufacture and are usually positioned in a separate part of the rupture disk assembly making the entire assembly costly to manufacture. In addition, problems have been encountered in the operation of reverse buckling rupture disk assemblies including knife blades due to the knife blades becoming dull from corrosion and/or repeated usage and failing to sever the rupture disk upon reversal whereby pressure relief is not accomplished, or only partial severing of the rupture disk results whereby full opening is not achieved.

With the development and use of scored reverse buckling rupture disks, the problems associated with the use of knife blades were overcome. However, problems have also been encountered in the use of scored reverse buckling rupture disks in that such disks at low design pressures sometimes reverse erratically whereby full opening is not achieved or reverse without rupturing. Also, if such disks are damaged, i.e., accidentally deformed, during handling or installation, reversal without rupture can occur. Unless the disks are manufactured in a manner whereby the ratio of tension rupture pressure to design reversal rupture pressure is low, the fluid pressure required to rupture the disks in tension after reversal without rupture can exceed the design reversal rupture pressure of the disks by a considerable amount creating an extremely dangerous over-pressure condition in the vessels or system intended to be protected. The term "tension rupture pressure" is used herein to mean the fluid pressure exerted on the concave-convex portion of a reverse buckling rupture disk required to cause the rupture thereof after the concave-convex portion has reversed but not ruptured due to damage or other reason. The term "design reversal rupture pressure" is used herein to mean the fluid pressure exerted on the convex side of a reverse buckling rupture disk at which the concave-convex portion thereof is designed to (and does under normal conditions) reverse itself and rupture.

Since under applicable pressure vessel and pipe codes, the test pressure of pressure vessels and systems is set at 1.5 times the design pressure of such vessels and systems, it is desirable that reverse buckling rupture disks have a design reversal rupture pressure at or below the design pressure of the vessel or system to be protected and a tension rupture pressure no higher than 1.5 times the design reversal rupture pressure. This insures that if such disks reverse without rupturing, rupture will ultimately occur before the pressure level within the vessel or system exceeds the test pressure thereof. In applications for scored reverse buckling rupture disks wherein the design reversal rupture pressure is in a normal pressure range, i.e., above about 125 psig in 1" size to above about 40 psig for 6" size, scored reverse buckling rupture disks have been developed and used successfully wherein the ratio of tension rupture pressure to design reversal rupture pressure is 1.5 or less. However, in low pressure applications, the ratio of tension rupture pressure to design reversal rupture pressure is more difficult to control resulting in a possibility that the test pressure of the vessel or system being protected will be exceeded before rupture occurs, and because of the low fluid pressure, reversal of a scored reverse buckling rupture disk can more readily take place without sufficient force being exerted on the disk after reversal to cause it to fully tear along the lines of weakness created by the scores thereon resulting in only partial opening. Thus, the use of scored reverse buckling rupture disks has been limited to applications wherein the design reversal rupture pressures thereof are within the normal pressure range mentioned above.

In most reverse buckling rupture disk apparatus developed and used heretofore, problems have been encountered which result from uncontrolled reversal of the disks. That is, nearly all of the reverse buckling rupture disks utilized heretofore include a concave-convex portion connected to an annular flat flange portion by a curved transition connection. With the exception of certain designs which reverse from the center portion outwardly, e.g., scored reverse buckling rupture disks and others including weakened center portions, when excess fluid pressure is exerted on such disks, the reversal process starts at the transition connection. That is, the transition connection is moved inwardly towards the center of the disk at a point thereon having the least resistance followed by the reversal of the entire concave-convex portion of the disk. Heretofore, the particular point along the transition connection at which the reversal starts has been left to chance, sometimes resulting in less than desirable operational results.

By the present invention, a safety pressure relief apparatus of the reverse buckling rupture disk type is provided which is economical to manufacture and which includes a knife blade for severing the disk upon reversal, but which obviates the problems relating to knife blades mentioned above. Further, the apparatus of the present invention achieves full opening in extremely low pressure applications while maintaining a ratio of tension rupture pressure to design reversal rupture pressure of 1.5 or less. Finally, the reversal process of the rupture disk of this invention is controlled in a manner whereby the severed section of the rupture disk formed upon reversal is retained and prevented from being moved downstream with the fluid being relieved.

SUMMARY OF THE INVENTION

A safety pressure relief apparatus comprised of a reverse buckling rupture disk including a concave-convex portion connected to an annular flat flange portion by a curved transition connection; a thin support member having an annular flat flange portion attached to the annular flat flange portion of the rupture disk and for supporting the transition connection thereof which includes a cutting edge positioned interiorly of the transition connection forming an opening in the support member so that when the concave-convex portion of the rupture disk reverses itself, the cutting edge severs the disk and a section thereof passes through the opening in the support member.

It is, therefore, an object of the present invention to provide a safety pressure relief apparatus of the reverse buckling rupture disk type including a knife blade for severing the disk upon reversal which is economical to manufacture.

A further object of the present invention is the provision of a reverse buckling rupture disk assembly including a knife blade which after rupture can economically be discarded and replaced with an entirely new assembly.

Yet a further object of the present invention is the provision of a safety pressure relief apparatus of the reverse buckling rupture disk type which achieves full opening in extremely low pressure applications while still maintaining a ratio of tension rupture pressure to design reversal rupture pressure of 1.5 or less.

Another object of the present invention is the provision of a safety pressure relief apparatus which includes a reverse buckling rupture disk wherein the direction of reversal upon failure is controlled and the severed section of the disk formed upon reversal is retained.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a cross-sectional view taken along line 3—3 of FIG. 1.

FIG. 4 is a sectional view taken along line 4—4 of FIG. 1.

FIG. 7 is a sectional view similar to FIG. 4 illustrating the apparatus after the rupture disk thereof has reversed itself, been severed by the cutting edge of the apparatus and the severed portion caught and retained on the apparatus.

FIG. 8 is a sectional view taken along line 8—8 of FIG. 7.

FIG. 9 is a graph illustrating the minimum design rupture pressure for various sizes of the apparatus of the present invention and the minimum design rupture pressure for various sizes of heretofore used scored reverse buckling rupture disk assemblies.

DESCRIPTION OF PREFERRED EMBODIMENTS

Figure 1:
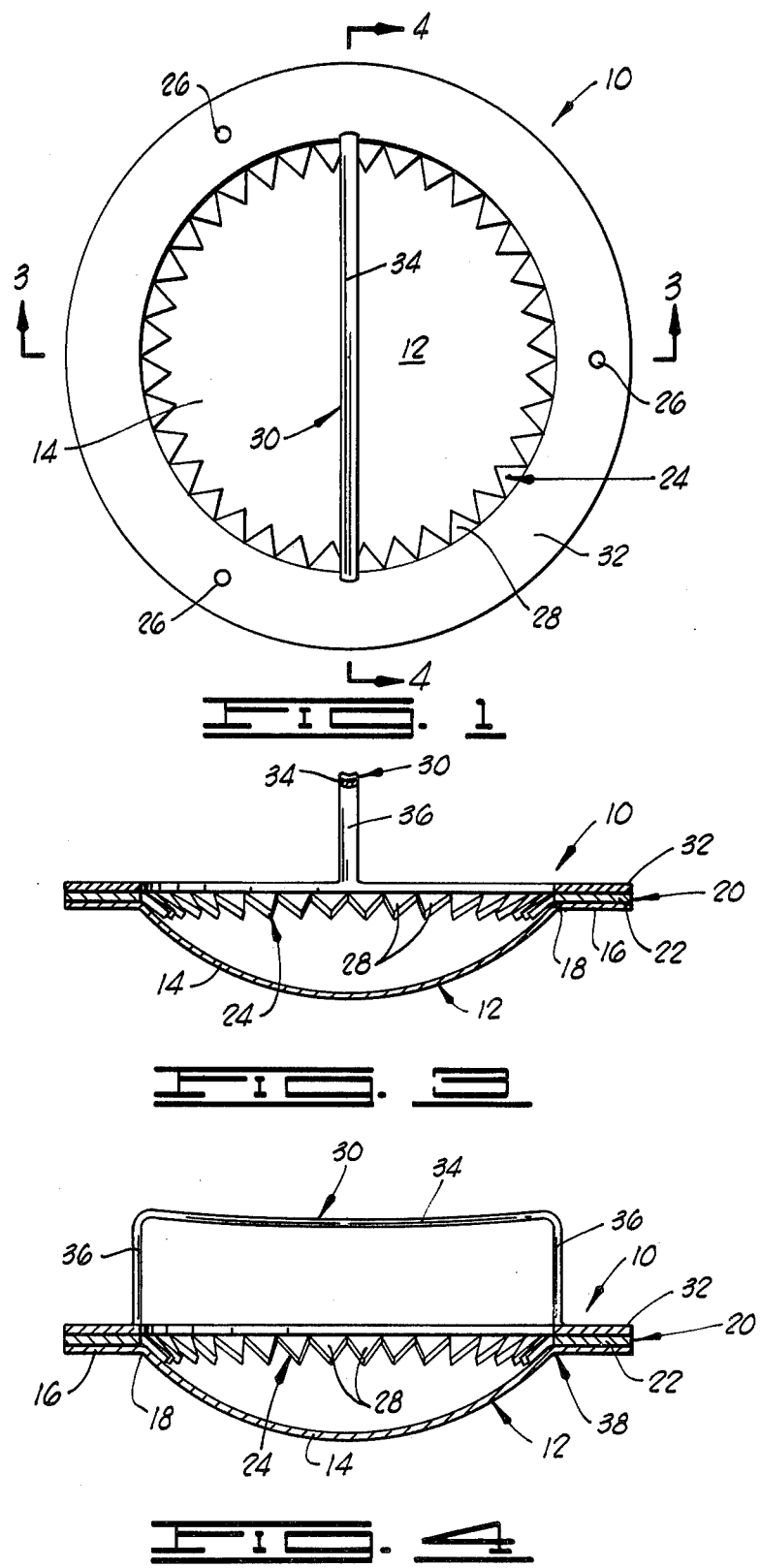
FIG. 1 is a bottom plan view of the safety pressure relief apparatus of the present invention.

Referring now to the drawings and particularly to FIGS. 1-4, one form of the apparatus of the present invention is illustrated and generally designated by the numeral 10. The apparatus 10 is comprised of a reverse buckling rupture disk 12 having a concave-convex portion 14 connected to an annular flat flange portion 16 by a curved transition connection 18. The annular flat flange portion 16 of the rupture disk 12 is attached to a thin support member 20 which can be economically formed of sheet metal or the like having an annular flat flange portion 22 and a circular serrated cutting edge 24. The annular flat flange portion 22 of the support member 20 is of a size corresponding to the size of the annular flat flange portion 16 of the rupture disk 12, and in a preferred embodiment, the flange portions of the rupture disk and support member are attached together by a plurality of spot welds 26.

As best shown in FIGS. 3 and 4, the circular serrated cutting edge 24 of the support member 20 is positioned interiorly of the transition connection 18 of the rupture disk 12 whereby the transition connection is supported by the annular flat flange portion of the support member 20. Further, the serrations 28 of the cutting edge 24 are preferably formed in the shape of triangles and are inclined towards and into the concave-convex portion 14 of the rupture disk 12 at an angle in the range of from about 30° to about 45°.

Attached to the side of the annular flat flange portion 22 of the support member 20 opposite from the side thereof to which the rupture disk 12 is attached is a bar 30 for catching the severed section of the rupture disk 12 after the rupture disk 12 reverses itself and is severed by the cutting edge 24 of the support member 20. In a presently preferred form, the bar 30 is attached to an annular flange member 32 formed of sheet metal or the like which is in turn attached to the annular flat flange portion 22 of the support member 20 by the spot welds 26. As shown best in FIGS. 1 and 2, the bar 30 is preferably spaced a distance from the support member 20 and is positioned across the circular opening formed therein by the cutting edge 24 thereof in a plane substantially parallel to the plane of the annular flat flange portion 22. Most preferably, the bar 30 includes a curved catcher portion 34, the convex side of which faces the rupture disk 12 and a pair of arm portions 36 attached to the ends of the catcher portion 34 and to the annular flange member 32. However, the bar 30 can be attached directly to the annular flat flange portion 22 of the support member 20 and can lie in the plane of the annular flat flange portion 22 thereof or can be spaced a distance therefrom. In addition. the particular shape of the opening formed in the support member 20 by the cutting edge 24 thereof is not critical although a circular shape is preferred. Also, the particular design or form of the cutting edge 24 can be changed, but a cutting edge comprised of the inclined serrations 28 described above and illustrated in the drawings is preferred in that such a cutting edge readily penetrates the concave-convex portion 14 of the rupture disk 12 upon reversal and severs a central section therefrom even in very low pressure applications, thereby insuring that the ratio of tension rupture pressure to design reversal rupture pressure of the rupture disk 12 is no greater than 1.5.

Figure 2:
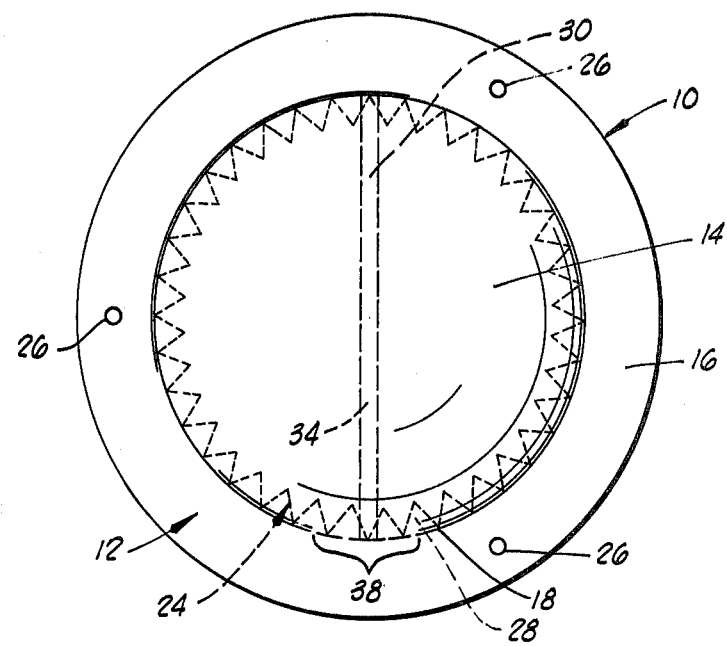
FIG. 2 is a top plan view of the apparatus of FIG. 1.

As best shown in FIG. 2, a portion 38 of the curved transition connection 18 of the rupture disk 12 is formed of a substantially greater radius of curvature than the remaining portion of the transition connection 18. As mentioned above, in operation, the reverse buckling rupture disk 12 is in compression, i.e., the forces exerted on the disk by the fluid under pressure are transmitted to the convex side of the concave-convex portion 14 placing the concave-convex portion in compression. The compressive forces are transmitted by way of the curved transition connection 18 to the annular flat flange portion 22 of the support member 20 supporting the transition connection 18. Generally, for a particular thickness of the rupture disk 12, the smaller the radius of curvature of the transition connection 18, the more resistance the rupture disk 12 has to reversal. That is, when the forces exerted on the disk 12 exceed the disk's ability to resist reversal the transition connection 18 moves or rolls inwardly at the point thereon of the greatest radius of curvature, followed by the reversal of the entire concave-convex portion 14 thereof. By producing the disk 12 with the portion 38 of the transition connection 18 having a substantially greater radius of curvature than the remaining portion of the transition connection 18, the reversal process starts at the portion 38 and proceeds in a direction substantially transferse to the portion 38.

Figure 5:
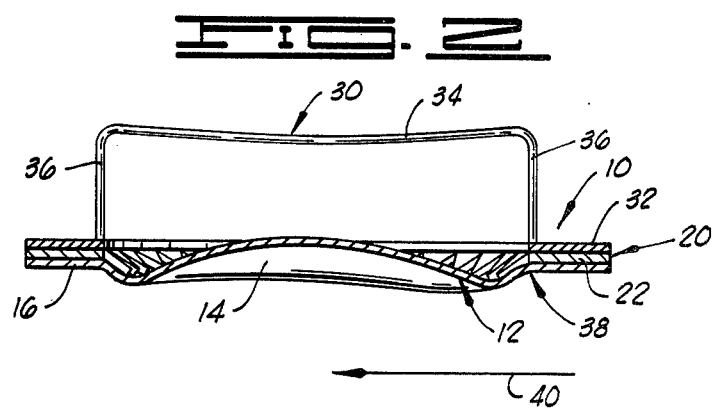
FIG. 5 is a sectional view similar to FIG. 4 illustrating the apparatus at the start of the rupture disk reversal and severing process.
Figure 6:
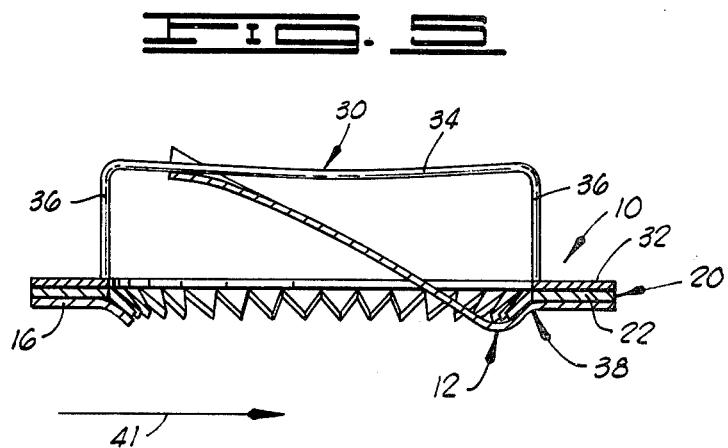
FIG. 6 is a sectional view similar to FIG. 4 illustrating the apparatus during a latter part of the rupture disk reversal and severing process.

Referring specifically to FIGS. 2 and 5 through 8 of the drawings, the portion of enlarged radius of curvature 38 of the transition connection 18 is positioned adjacent one end of the catcher portion 34 of the bar 30 so that the direction of reversal of the disk 12 is substantially parallel to the axis of the catcher portion 34. As shown in FIG. 5, when the fluid pressure exerted on the convex side of the concave-convex portion 14 of the disk 12 reaches the level at which the concave-convex portion reverses itself, due to the larger radius of curvature of the portion 38 of the transition connection 18 and the consequent lesser resistance to inward roll of such portion, the reversal process begins at the portion 38 and progresses in a direction substantially parallel to the axis of the catcher portion 34 of the bar 30 as shown by the arrow 40. The reversal process continues in the direction shown by the arrow 40 across the concave-convex portion 14 until the entire concave-convex portion 14 has reversed itself whereupon the part of the portion 14 opposite the portion 38 of the transition connection 18 is severed by the cutting edge 24 of the support member 20. The severing of the portion 14 then continues as shown in FIG. 6 in the opposite direction as indicated by the arrow 41 with the last part of the rupture disk 12 to be severed being adjacent the portion 38 of the transition connection 18.

As shown in FIGS. 7 and 8, when the reversal and severing process is completed, an entire center section 42 of the rupture disk 12 is severed by the cutting edge 24 of the support member 20, which section passes through the support member 20. Because the reversal and severing of the concave-convex portion 14 of the disk 12 is controlled in directions substantially parallel to the axis of the catcher portion 34 of the bar 30, after the severed section 42 thereof passes through the opening in the support member 20, it is caught by the catcher portion 34. That is, the severed section 42 is wrapped around the catcher portion 34 by the force of the escaping fluid traveling through the opening in the support member 20 whereby the severed section 42 is balanced and retained on the bar 30. If the reversal process of the rupture disk 12 is allowed to proceed in an uncontrolled manner, i.e., to start at a point on the transition connection 18 whereby the directions of reversal and severing are transverse to the axis of the catcher portion 34 of the bar 30, it is possible for the severed section 42 to contact the catcher portion 34 off center and tear apart or to fold on the catcher portion 34 in an unbalanced manner whereby it will subsequently be removed therefrom by the force of the escaping fluid.

In a presently preferred embodiment of the present invention, the transition connection 18 of the rupture disk 12 is formed whereby the radius of curvature of the portion 38 thereof is in the range of from about 1.5 to about 2 times greater than the radius of curvature of the remaining portion of the transition connection. The length of the portion 38 of the transition connection 18 varies with the particular size of rupture disk involved, but generally is in the range of from about ½ inch to about ¾ inch for rupture disks of 1 inch size up to from about 1 inch to 1½ inches for rupture disks of 6 inch size and larger.

Thus, in operation of the apparatus 10, the entire apparatus is clamped between a pair of conventional pipe flanges or other clamping means which are in turn connected to a pressure relief connection of a vessel or system to be protected. The apparatus 10 is positioned so that the concave-convex portion 14 of the rupture disk 12 faces the upstream flange and the bar 30 thereof faces the downstream flange. When an over-pressure condition is reached in the vessel or system equal to or exceeding the design reversal rupture pressure of the disk 12, the concave-convex portion 14 thereof reverses itself and is severed by the cutting edge 24 of the support member 20 whereby the entire central section 42 thereof passes through the support member 20. Because the direction of reversal of the concave-convex portion 14 of the disk 12 is controlled by positioning the portion of enlarged radius of curvature 38 of the transition connection 18 thereof adjacent one end of the bar 30, the severed section 42 of the rupture disk 12 is caught by the catcher portion 34 of the bar 30 whereby substantially equal areas of the severed section 42 are folded on opposite sides of the catcher portion 34 of the bar 30 thereby retaining the severed section 42 on the bar 30. Referring now to FIG. 9, a graph is presented illustrating the minimum design rupture pressures for various sizes of the apparatus of the present invention (line 60) and the minimum design rupture pressures for corresponding sizes of heretofore used scored reverse buckling rupture disk assemblies (line 50). The term "minimum design rupture pressure" is used herein to mean the minimum fluid pressures exerted on the reverse buckling rupture disk assemblies whereby the disks will reliably reverse and fully open, and if reversal without rupture takes place due to damage, etc., the disks will rupture at a fluid pressure no greater than 1.5 times the design reversal rupture pressure. While the reverse buckling rupture disk assemblies can be utilized in applications below the minimum rupture pressures indicated in FIG. 9, their reliability is lessened drastically in that the probability of reversal without rupture is increased and the control of the ratio of tension rupture pressure to design reversal rupture pressure is much more difficult. The lines 50 and 60 representing the minimum design rupture pressures for scored reverse buckling rupture disk assemblies and the reverse buckling rupture disk apparatus of the present invention, respectively, are based on experience in actual operation of the apparatus. As shown, the reverse buckling rupture disk apparatus of the present invention cam be reliably used in applications wherein the design reversal rupture pressure of the disks is much lower than those achievable by scored reverse buckling rupture disk assemblies. In addition, because of the economical construction of the apparatus of the present invention, i.e., the support member 20 and annular flange member 32 if used, can both be formed of sheet metal, when an overpressure condition causes the rupture of the apparatus, it can economically be discarded and replaced with an entire new apparatus. This is contrasted with scored reverse buckling rupture disk assemblies utilized heretofore and prior reverse buckling rupture disk assemblies including knife blades which include special parts and are costly to manufacture. Further, because the support member 20 is spot welded to the rupture disk 12, it stiffens the annular flange portion 16 thereof decreasing the chances of damage to the rupture disk 12 during handling and/or installation.

Thus, the present invention is well adapted to carry out the objects and attain the ends and advantages mentioned as well as those inherent therein. While numerous changes in the construction and arrangement of parts can be made by those skilled in the art, such changes are encompassed within the spirit of this invention as defined by the appended claims.

What is claimed is:

1. A safety pressure relief apparatus comprising:
   a reverse buckling rupture disk including a concave-convex portion connected to an annular flat flange portion by a curved transition connection, a portion of said curved transition connection being of a substantially greater radius of curvature than other portions thereof whereby when said concave-convex portion of said disk reverses itself, such reversal starts at said portion of greater radius of curvature;
   a support member having an annular flat flange portion for engaging said annular flat flange portion of said rupture disk and for supporting said transition connection thereof, said support member including a serrated cutting edge the serrations of which are inclined towards and into said concave-convex portion of said rupture disk and positioned interiorly of said transition connection forming a circular opening in said support member so that when said concave-convex portion of said rupture disk reverses itself, said cutting edge severs said disk whereby a section thereof passes through said opening in said support member; and
   a bar for catching said severed section of said disk after it passes through said opening in said support member, said bar being attached to said support member and positioned across said opening in said support member in a plane substantially parallel to the plane of said annular flat flange portion thereof.

2. The apparatus of claim 1 wherein said portion of greater radius of curvature of said transition connection is positioned with respect to said bar whereby the direction of reversal of said rupture disk is substantially parallel to the axis of said bar.

3. A safety pressure relief apparatus comprising:
   a reverse buckling rupture disk including a concave-convex portion connected to an annular flat flange portion by a curved transition connection;
   a support member having an annular flat flange portion attached to said annular flat flange portion of said rupture disk, said support member including a serrated cutting edge positioned interiorly of said transition connection and forming a circular opening in said support member so that when said concave-convex portion of said rupture disk reverses itself, said cutting edge severs said rupture disk whereby a circular section thereof passes through said opening;
   an annular flange member attached to said annular flat flange portion of said support member on the side thereof opposite from the side to which said rupture disk is attached, said annular flange member including a bar attached thereto for catching said severed circular section of said rupture disk after it passes through said opening in said support member, said bar including a catcher portion positioned across said opening in said support member in a plane substantially parallel to the plane of said annular flange member and a pair of arm portions attached to the ends of said catcher portion and to said annular flange member whereby said catcher portion of said bar is spaced a distance from the plane of said annular flange member.

4. The apparatus of claim 3 wherein the serrations of said cutting edge are inclined in a direction towards said rupture disk.

5. The apparatus of claim 4 wherein a portion of said curved transition connection of said rupture disk is of a substantially greater radius of curvature than the remaining portion thereof whereby when said concave-convex portion of said disk reverses itself, such reversal starts at said portion of greater radius of curvature.

6. The apparatus of claim 5 wherein said portion of greater radius of curvature of said transition connection is positioned with respect to said catcher portion of said bar whereby the direction of reversal of said rupture disk is substantially parallel to the axis of said catcher portion of said bar.

7. The apparatus of claim 6 wherein said portion of said transition connection of greater radius of curvature has a radius of curvature in the range of from about 1.5 to about 2 times greater than the radius of curvature of the remaining portion thereof.

8. The apparatus of claim 7 wherein said portion of said transition connection of greater radius of curvature has a length in the range of from about ½ inch to about 1½ inches.

* * * * *